(12) United States Patent
Culligan et al.

(10) Patent No.: US 7,292,422 B2
(45) Date of Patent: Nov. 6, 2007

(54) OCCUPANCY-BASED CIRCUIT BREAKER CONTROL

(75) Inventors: John Louis Culligan, Woodstock, GA (US); Ray Montgomery Clark, Snellville, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 374 days.

(21) Appl. No.: 10/999,152

(22) Filed: Nov. 29, 2004

(65) Prior Publication Data
US 2006/0114630 A1 Jun. 1, 2006

(51) Int. Cl.
*H02H 9/02* (2006.01)
(52) U.S. Cl. .............................. 361/93.2; 361/5; 361/62
(58) Field of Classification Search ................. 361/115, 361/62
See application file for complete search history.

(56) References Cited

U.S. PATENT DOCUMENTS

| | | | |
|---|---|---|---|
| 4,236,186 A * | 11/1980 | Takagi | ............................ 361/9 |
| 4,240,123 A | 12/1980 | Hotta | |
| 4,272,750 A | 6/1981 | Hotta et al. | |
| 4,371,947 A * | 2/1983 | Fujisawa | ...................... 710/69 |
| 4,694,373 A * | 9/1987 | Demeyer | ....................... 361/96 |
| 5,009,192 A * | 4/1991 | Burman | ........................ 119/720 |
| 5,902,978 A | 5/1999 | Zehnder et al. | |
| 5,905,243 A | 5/1999 | Zehnder et al. | |
| 5,925,863 A | 7/1999 | Zehnder et al. | |
| 5,929,409 A | 7/1999 | Zehnder et al. | |
| 6,268,989 B1 * | 7/2001 | Dougherty et al. | ........... 361/63 |
| 6,429,394 B2 | 8/2002 | Hunger et al. | |
| 6,445,268 B1 | 9/2002 | Daum | |
| 6,665,197 B2 | 12/2003 | Gong et al. | |
| 6,717,791 B1 | 4/2004 | Wiesinger | |
| 6,735,063 B1 | 5/2004 | Bauer et al. | |

* cited by examiner

*Primary Examiner*—Michael Sherry
*Assistant Examiner*—Christopher J Clark

(57) ABSTRACT

A method and occupancy-based control device in a trip unit of a main circuit breaker, with the circuit breaker coupled to an electrical distribution system including at least one feeder circuit breaker and a load circuit. The occupancy-based control device comprises an input device associated with the electrical distribution system and coupled to the trip unit. A selector is coupled to the trip unit and configured to select a first set of parameters and a second set of parameters, with each set of parameters defining a mode of operation of the trip unit. A means for selecting one of the first set of parameters and a second set of parameters in response to a signal from the input device is provided wherein, the trip unit operates based on the selected set of parameters.

11 Claims, 2 Drawing Sheets

OCCUPANCY-BASED CIRCUIT BREAKER CONTROL

FIELD

The present invention relates to circuit breakers and more specifically to a power or main circuit breaker having a trip unit coupled to an occupancy-based control device for monitoring a flash protection boundary.

BACKGROUND

In a power or main circuit breaker system within an electric distribution system, a main circuit breaker or power circuit breaker is connected between a power source terminal and a plurality of branch load circuits. Additionally, feeder circuits may be coupled in the electrical distribution system. Typically, each branch or feeder circuit is protected by a circuit breaker or fuse connected between the power source and the load, such as an induction motor or the like. In operation, the main circuit breaker typically is configured to operate, or trip at a higher power setting, current pass through, then the branch circuit breakers or feeder circuit breakers. If a short circuit or other reason to cut power to a specific load circuit occurs, the feeder or branch circuit breaker is configured to open before the time delay designed into the main circuit breaker. In such operation, only the affected load is cut from the electrical distribution system with the remaining load circuits continuing to be connected to the electrical distribution system.

In the event that personnel, a human being, has to enter the area where a short circuit or work on an electrical machine is needed, there is a possibility of arc flash from the surrounding "live" circuitry. An arc flash hazard, as defined by the standard for electrical safety requirements for employee workplaces (NFPA70E-2000) defines arc flash hazard as "a dangerous condition associated with the release of energy caused by an electrical arc". An electrical arc operates at temperatures of several thousand degrees Celsius and creates a pressure wave, not unlike an explosion, causing metal particles, equipment parts and other loose items to be expelled from the electrical arc flash area in addition to the expulsion of hot, ionized gases. If a human being is in the vicinity of such arc flash hazard, bodily injury, including death can result. Federal regulations, as well as the National Electric Code, specifies warnings, markings, and personnel protection equipment, clothing, goggles, gloves, etc., that are designed to protect personnel working in such flash areas.

In addition to the warnings, discussed above, the setting of boundaries that mark where personnel could not enter without wearing appropriate protective gear/clothing is used to designate the arc flash hazard area. Before personnel could approach electrical gear within such designated flash protection boundary, the personnel would be required to wear fire-retardant arc flash suits which are hot, expensive and limit the personnel's ability to work on the electrical equipment. Another alternative available to working in the arc flash hazard protected area is to open the main circuit breaker which would cut power to all of the branch and feeder circuits protected by such main circuit breaker. Such procedure is expensive and inefficient.

Thus, there is needed a method of a main circuit breaker system operation using a trip unit that is capable of being programmed to operate in response to a first set of parameters or a second set of parameters corresponding to a condition relating to the main circuit breaker system, such as the presence of a human being within a designated area. There is further need for a method of reducing arc flash in a main circuit breaker system when a human being enters a predetermined flash protection boundary. There is an additional need for an occupancy-based control device coupled to a trip unit of the main circuit breaker that can change the instantaneous and short time protective settings of the circuit in response to a predetermined set of conditions.

SUMMARY OF THE INVENTION

There is provided a method of main circuit breaker system operation using a trip unit coupled to a main circuit breaker capable of being programmed to operate in response to a first set of parameters or a second set of parameters, corresponding to a condition related to the main circuit breaker system. The method comprises the steps of determining the conditions of the main circuit breaker system from an input signal from an input device. Selecting at least one mode of operation of the trip unit corresponding to the input signal. Executing the selected mode of operation of the trip unit, wherein the trip unit will operate in a predetermined manner. Another embodiment of the method includes the step of placing the input device at a predetermined distance from the main circuit breaker. The first set of parameters for the trip unit can be for a maximum system coordination with the second set of parameters set for optimum arc flash reduction.

There is also provided an occupancy-based control device in a trip unit of a main circuit breaker, with the main circuit breaker coupled to an electrical distribution system including at least one feeder circuit breaker and a load circuit. The occupancy-based control device comprises an input device associated with the electrical distribution system and coupled to the trip unit. A selector apparatus is coupled to the trip unit and configured to select a first set of parameters and a second set of parameters, with each set of parameters defining a mode of operation of the trip unit. A means for selecting one of the first set of parameters and a second set of parameters in response to a signal from the input device is provided wherein, the trip unit operates based on the selected set of parameters.

There is also provided a method of reducing arc flash in a main circuit breaker system when a human being enters a predetermined flash protection boundary. The main circuit breaker system includes a main circuit breaker having a trip unit capable of being programmed to operate in response to a first set of parameters or a second set of parameters with each set of parameters corresponding to a condition related to the main circuit breaker system. The method comprises the steps of determining the conditions of the main circuit breaker system from an input signal from an input device. Placing the input device at a flash protection boundary. Selecting at least one mode of operation of the trip unit corresponding to the input signal. Executing the selected mode of operation of the trip unit, wherein the trip unit will operate in a predetermined manner corresponding to one of the first set of parameters and second set of parameters.

There is further provided a circuit control for a circuit breaker. The control comprises a trip unit coupled to the circuit breaker and a flash protection detector coupled to the trip unit and configured to control the circuit breaker using at least two different control methods. The trip unit selects the method of control based upon the detection of occupancy in a flash protection boundary or a detection of a change in the status of occupancy of the flash protection boundary. Another embodiment of the circuit control is in a circuit breaker having an electronic trip unit.

DETAILED DESCRIPTION OF EXEMPLARY EMBODIMENTS

Figure 1:
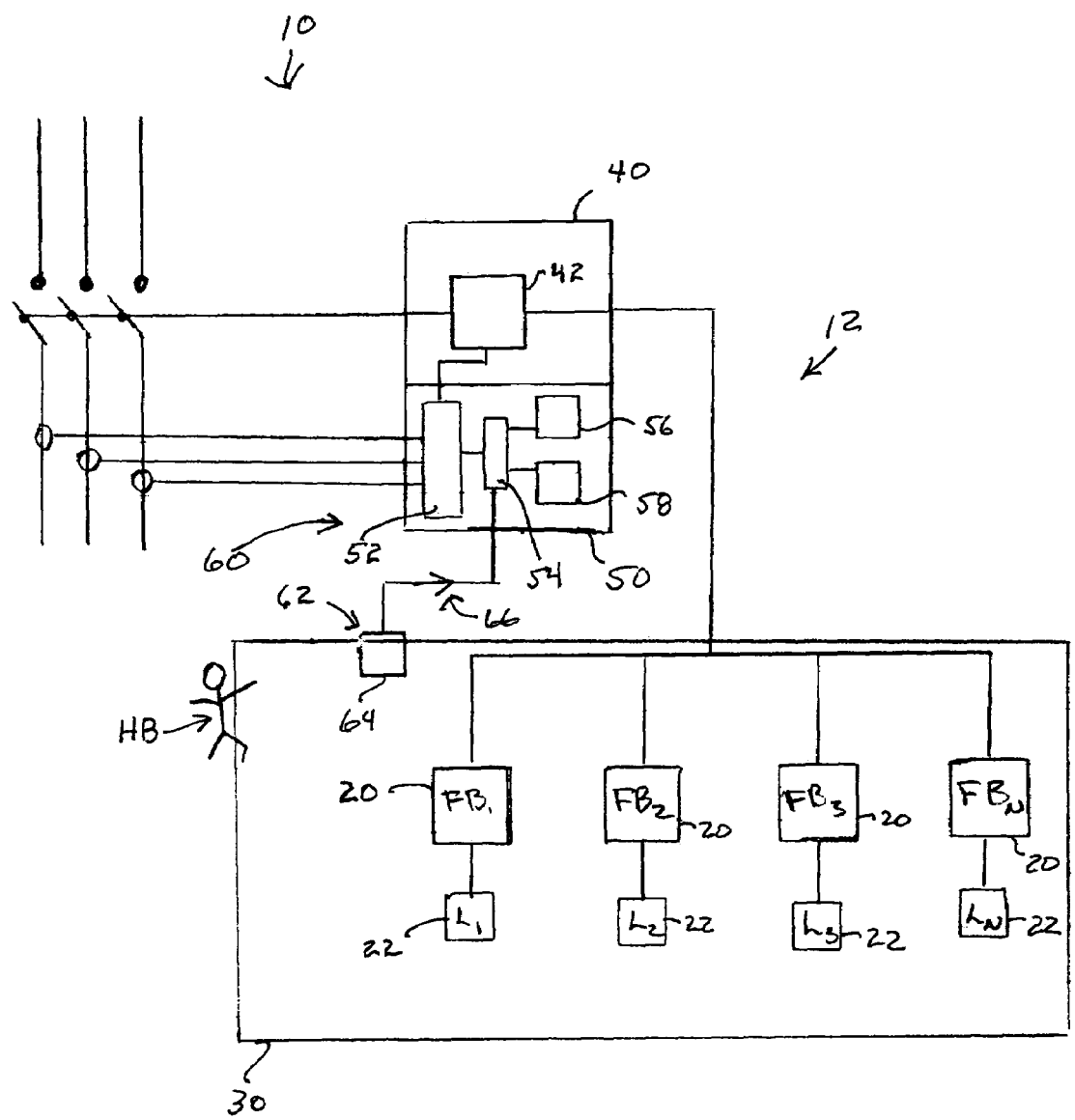
FIG. 1 is a schematic diagram of an exemplary embodiment of an electrical distribution system including a main circuit breaker having a trip unit coupled to an occupancy-based control device monitoring a predetermined flash protection boundary.

Before describing an exemplary embodiment of an occupancy-based control device 60 in a main circuit breaker system 12, several comments are appropriate. As mentioned above, high levels of arc flash energy are dangerous to personnel that may be working in the affected area. A publication of the Institute of Electrical and Electronic Engineers (IEEE) Document No. 1584 provides a guide for performing arc flash hazard calculations. It is those calculations that are utilized to set the parameters of the trip unit 50 of the main circuit breaker 40 in response to conditions relating to the main circuit breaker system 12.

In addition to the use of personal protective equipment (PPE) or opening the main circuit breaker, other methods of reducing arc flash have been used. For example, a ground fault detection system trips the circuit breaker during the lower current stages of fault development and prior to "bolted fault" conditions. The use of finger-safe electrical components can also reduce the chance that an arcing fault will occur. Further, use of current limiting over current protective devices which limit the fault current before the current reaches potential maximum value can be utilized. The current limiting action limits thermal and mechanical stress created by the fault currents. However, any or all of the above-mentioned devices or procedures are expensive to implement and difficult to maximize system coordination within the electrical power distribution system 10.

For purposes of this application, arc flash hazard occurs when electrical current is flowing through the air. Such arc fault current can reach temperatures up to 35,000° F. At such temperatures, materials can vaporize and when materials vaporize, they expand in volume (copper 67,000 times, water 1,670 times). In addition, the air blast that results from an arcing fault can forcefully spread the molten metal some distances. The incident energy that is dissipated during an arc fault produces intense heat, infrared and ultraviolet radiation, sound blasts, and pressure waves.

A predetermined flash protection boundary 30 is established around electrical equipment 20,22 in an effort to minimize the effects of the arc flash hazard. The predetermined boundary 30 is established based on the voltage and currents and power generation values of a given electrical distribution system 10. Typically, the flash protection boundary 30 is an approach limit at a distance from exposed live electrical parts within which a person (human being) could receive second degree burns if an electrical arc flash were to occur. Based on electrical standards and governmental regulations, an incident energy value of 1.2 calories per square centimeter is the accepted maximum value at which a second degree burn could be expected. Within the established predetermined flash protection boundary 30, only "qualified" workers (personnel) are permitted and such personnel are required to use appropriately rated PPE. An example of the type of PPE required, is directly related to the incident energy as indicated in the National Fire Protection Association Publication 70-E, Table 3: 3.9.3 of Part 2. As discussed above, any or all of the above conventional methods and devices add expense or make the repair or maintenance of electrical equipment within the predetermined flash protection boundary 30 difficult.

Referring now to the figures, FIG. 1 illustrates an exemplary embodiment of an electrical distribution system 10. The disclosed occupancy-based control device 60 provides a way for a system designer of an electrical distribution system 10 to achieve delayed tripping for trip coordination purposes within the electrical distribution system 10 and to lower levels of arc flash hazard. The occupancy-based control device 60 employs a dual protective setting capability to switch between a first set of parameters 56 and a second set of parameters 58 corresponding to a condition related to the main circuit breaker system 12.

An occupancy-based control device 60 is included in a trip unit 50 of a main circuit breaker 40. The main circuit breaker 40 is coupled to the electrical distribution system 10 which includes at least one feeder circuit breaker 20 and a load circuit 22. The occupancy-based control device 60 includes an input device 62 associated with the electrical distribution system 10 and is coupled to the trip unit 50. The selector apparatus 54 is coupled to the trip unit 50 and is configured to select a first set of parameters 56 and a second set of parameters 58, with each set of parameters 56, 58 defining a mode of operation of the trip unit 50. A means for selecting 54, one of a first set of parameters 56 and the second set of parameters 58 in response to a signal 66 from the input device 62, is included in the trip's unit 50, wherein the trip unit 50 operates based on the selected set of parameters.

The first set of parameters 56 can be a "normal operation" trip parameter set. Typically, the trip parameter set is determined to optimize the main circuit breaker 40 for best selective trip coordination of the main circuit breaker system 12. For purposes of this application, the first set of parameters 56 will be referred to as "A". The second set of parameters 58 is set to determine the lowest possible trip settings that will allow the main circuit breaker 40 to carry normal loads, including normal in rush currents for a particular system.

The second set of parameters 58, for purposes of this application will be referred to as a "B" parameter set. It is within the second set of parameters 58 that the lowest arc flash energy is set. That lowest arc flash energy as related to the instantaneous trip function of the main circuit breaker 40, calculations of the arc flash energy can be made based on the available fault current in the main circuit breaker system 12 and the operating time of the main circuit breaker 40, is determined from the settings selected.

An example of a main circuit breaker 40 is the WL circuit breaker designed and manufactured by Siemens Corporation. An occupancy based control device 60 for use with the WL circuit breaker is a Dynamic Arc Flash Sentry also designed and manufactured by Siemens Corporation. By using the occupancy-based control device 60, the designer can provide an instantaneous trip function in the main circuit breaker 40 only when an animal such as a human being (HB) is within the predetermined flash protection boundary 30. At all other times, the occupancy-based control device 60 allows the main circuit breaker 40 to be set at its normal operation mode. It should be noted that there are specialty circuit breakers currently available that reduce arc flash however, such circuit breakers must implement instantaneous tripping at all times to achieve their flash energy reduction which minimizes or eliminates the system coordination feature. The occupancy-based control device 60, provides the ability to have a maximum system coordination in one mode and an optimal arc flash reduction in another mode.

In FIG. 1, the predetermined flash protection boundary 30 encompasses the portion of the electrical distribution system 10 and particularly the part of the main circuit breaker system 12. An input device 62 is positioned at the flash arc protection boundary 30 and configured to respond to the presence of a human being HB moving into the flash arc protection boundary 30. One exemplary embodiment of the input device 62 is a switch 64. The switch 64 can be a motion detector, a door switch, floor mats with contacts, an infrared system, an optical or audio frequency system, and the like.

Figure 2:
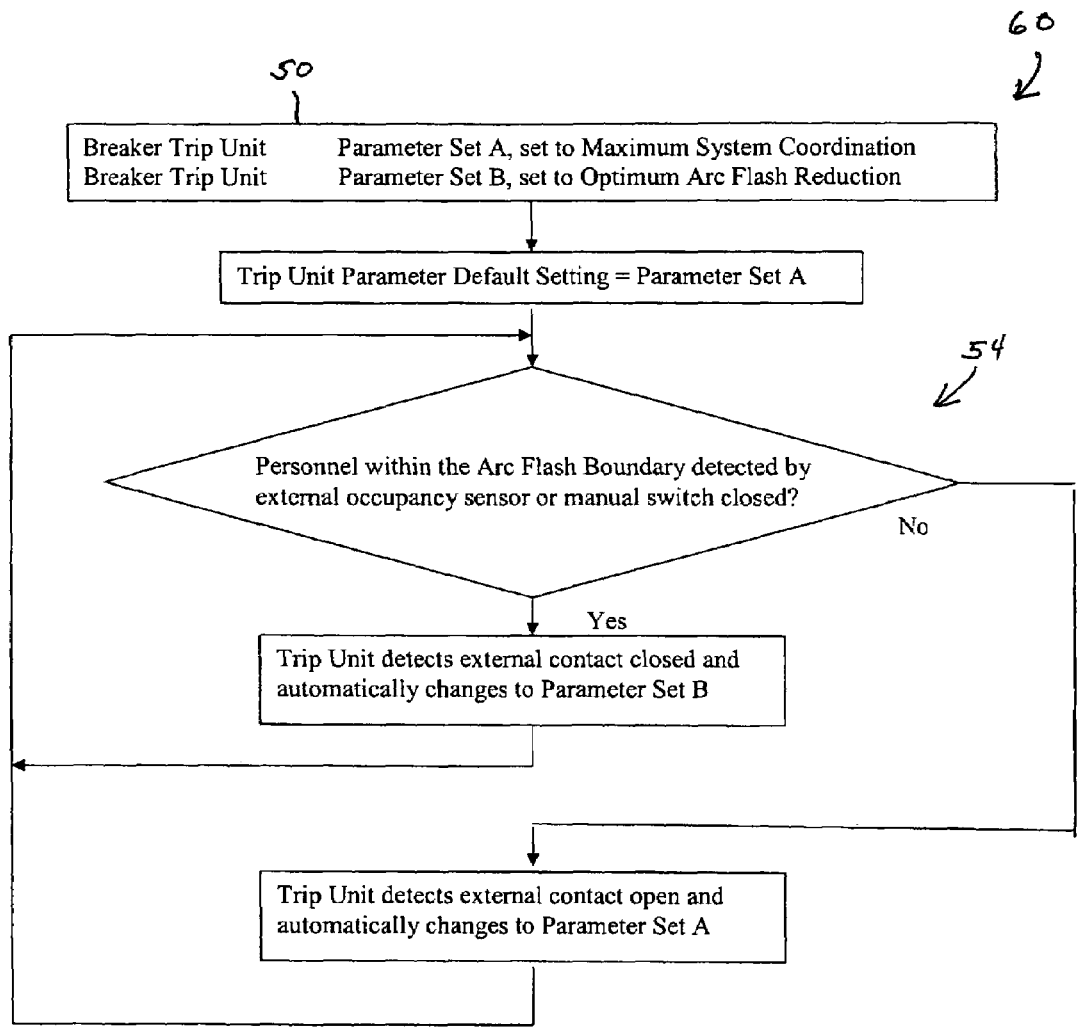
FIG. 2 is a flow chart illustrating an exemplary embodiment of an occupancy-based control device.

When the input device 62 detects the presence of a human being HB within the predetermined flash protection boundary 30, a signal 66 is transmitted to the selector apparatus 54 in the trip unit 50. It should be understood that the signal 66 can be transmitted over a hard wire circuit, or by radio signal or an optical signal. The signal 66 represents the condition of the main circuit breaker system 12 as illustrated in FIG. 2, when a human being is within the arc flash boundary 30 as detected by the input device 62. In that event, the trip unit 50 is automatically set to the second set of parameters 58, the "B" set. If the input device 62 does not detect the presence of a human being HB, then the trip unit 50 of the main circuit breaker 40 remains in the first set of parameters 56, the "A" set or switches back to the "A" set after the human being HB leaves the flash protection boundary 30.

The main circuit breaker 40 includes an operating mechanism 42 as well as the trip unit 50. The trip unit 50 typically includes a micro processor 52 which operates the logic of the selector apparatus 54 to make the switch between the first set of parameters 56 and the second set of parameters 58 as well as the determination of an instantaneous or delayed trip of the power circuit 40. As mentioned above, an example of such main circuit breaker 40 and trip unit 50 is provided by the WL circuit breaker manufactured by Siemens Corporation.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature Thus, there is provided an occupancy-based control device in a trip unit of a main circuit breaker coupled to an electrical distribution system. It has also provided a method of main circuit breaker system operation using a trip unit coupled to a main circuit breaker capable of being programmed to operate in response to a first set of parameters or a second set of parameters corresponding to a condition relating to the main circuit breaker system. It should be understood that the occupancy-based control device can also be configured to sense the presence of an animal other than a human being, such as a bird or a dog. While the embodiments illustrated in the figures and described above are presently disclosed, it should be understood that these embodiments are offered by way of example only. Other modifications will be evident to those with ordinary skill in the art.

What is claimed is:

1. A method of circuit breaker system operation using a trip unit coupled to a circuit breaker capable of being programmed to operate in response to a first set of parameters or a second set of parameters, corresponding to a condition related to the circuit breaker system, the method comprising the steps of:

determining the condition of the circuit breaker system from a signal from an input device, wherein the input device is responsive to the presence of a human being;

selecting at least one mode of operation of the trip unit corresponding to the input signal, wherein in one mode the first set of parameters is for maximum system coordination and wherein in another mode the second set of parameters is for optimum arc flash reduction; and executing the selected mode of operation of the trip unit.

2. The method of claim 1, including the step of placing the input device a predetermined distance from the circuit breaker.

3. The method of claim 1, wherein the input device is a switch.

4. An occupancy-based control device in a trip unit of a circuit breaker, with the power circuit breaker coupled to an electrical distribution system including at least one feeder circuit breaker and a load circuit, the occupancy-based control device comprising:

an input device associated with the electrical distribution system and coupled to the trip unit, wherein the input device is responsive to the presence of a human being;

a selector coupled to the trip unit and configured to select a first set of parameters and a second set of parameters, with each set of parameters defining a mode of operation of the trip unit, wherein in one mode the first set of parameters is for maximum system coordination and wherein in another mode the second set of parameters is for optimum arc flash reduction; and a means for selecting one of the first set of parameters and second set of parameters in response to a signal from the input device, wherein the trip unit operates based on the selected set of parameters.

5. The occupancy-based control device of claim 4, wherein the input device is located a predetermined distance from the power circuit breaker.

6. The occupancy-based control device of claim 4, wherein the input device is a switch.

7. A method of reducing arc flash in a circuit breaker system when a human being enters a predetermined flash protection boundary, with the circuit breaker system including a circuit breaker having a trip unit capable of being programmed to operate in response to a first set of parameters or a second set of parameters, corresponding to a condition related to the circuit breaker system, the method comprising the steps of:

determining the condition of the circuit breaker system from a signal from an input device, wherein the input device is responsive to the presence of a human being;

placing the input device at the flash protection boundary;

selecting at least one mode of operation of the trip unit corresponding to the signal; and executing the selected mode of operation of the trip unit, wherein the trip unit will operate in a predetermined manner corresponding to one of the first set of parameters and second set of parameters, wherein in one mode the first set of parameters is for maximum system coordination and wherein in another mode the second set of parameters is for optimum arc flash reduction.

8. The method of claim 7, wherein the input device is a switch.

9. A circuit control for a circuit breaker, the control comprising:
  a trip unit coupled to the circuit breaker; and
  a flash protection detector coupled to the trip unit and configured to control the circuit breaker using at least two different control methods, wherein the trip unit selects the method of control based upon the detection of occupancy in a flash protection boundary or a detection of a change in the status of occupancy of the flash protection boundary.

10. The circuit control of claim 9, wherein the trip unit is an electronic trip unit.

11. The circuit control of claim 9 wherein the circuit breaker is a main circuit breaker.

* * * * *